United States Patent [11] 3,611,169

[72] Inventors Donald T. Hess
Ozone Park;
Kenneth K. Clarke, New York, both of N.Y.
[21] Appl. No. 824,013
[22] Filed Aug. 15, 1968
[45] Patented Oct. 5, 1971
[73] Assignee Polytechnic Institute of Brooklyn
Brooklyn, N.Y.

[54] FREQUENCY DEMODULATOR FOR NOISE THRESHOLD EXTENSION
8 Claims, 4 Drawing Figs.

[52] U.S. Cl. 329/135, 325/347, 325/475, 329/132
[51] Int. Cl. H03d 3/00
[50] Field of Search 329/131–136; 325/347, 348, 473–476, 480

[56] References Cited
UNITED STATES PATENTS

| | | | |
|---|---|---|---|
| 2,609,493 | 9/1952 | Wilmotte | 329/131 X |
| 2,686,259 | 8/1954 | Koch | 329/132 |
| 2,981,837 | 4/1961 | Ruthroff | 325/347 |
| 3,193,771 | 7/1965 | Boatwright | 325/347 X |
| 3,299,357 | 1/1967 | Darlington | 325/480 X |

*Primary Examiner*—Alfred L. Brody
*Attorney*—John L. Wiegreffe

ABSTRACT: Described herein is a frequency modulation signal demodulation system which utilizes the amplitude modulation information inherent in a noise-corrupted frequency modulation carrier to control the parameters of a feedback loop, through which the demodulated FM information is passed, during the occurrence of large noise-induced, pulselike disturbances in the demodulated frequency modulation information. This function is performed by a circuit configuration which includes an amplitude modulation demodulator and a frequency modulation demodulator supplied in parallel from the input to the system for deriving information signals which are respective functions of the instantaneous envelope information and the instantaneous frequency modulation information. The control of the parameters of the feedback loop may be accomplished by the instantaneous envelope information directly or by the envelope information on which some process has been performed. The description also refers to the fact that the envelope detector may have linear or nonlinear characteristics. One way in which the envelope information may be processed is by a nonlinear quantizer followed by a time delay circuit which is interposed between the envelope demodulator and the means for controlling the feedback loop which modifies the frequency modulation information signals. The final output signals may be taken from the output of the feedback loop through a low-pass filter. If desired, an equalizing filter may also be interposed between the output of the feedback loop and the final low-pass filter.

PATENTED OCT 5 1971 3,611,169

INVENTORS
Kenneth K. Clarke
& Donald T. Hess
BY [signature]
ATTORNEY

FREQUENCY DEMODULATOR FOR NOISE THRESHOLD EXTENSION

BACKGROUND OF THE INVENTION

This invention is basically a frequency modulation demodulator system capable of extending the noise threshold exhibited by conventional, limiter-discriminator demodulators. As such, it may be added to any existing frequency modulation receiver to extend the noise threshold of that receiver. The present invention extends the noise threshold by eliminating or reducing the strength of the severe noise-induced, pulselike disturbances (hereinafter referred to as clicks) in the instantaneous carrier frequency which are responsive for the threshold in conventional FM discriminators.

Frequency modulation threshold extension systems are not new. Representatives of some of the prior art systems are the phase-locked loop FM demodulator and the frequency demodulator with feedback. A typical illustration of the phase-locked loop demodulator is described in an article by F. J. Charles and W. C. Lindsey in the proceedings IEEE, Volume 54, No. 9, pages 1,152 to 1,166 inclusive, Sept. 1966, entitled "Some Analytical and Experimental Phase-Locked Loop Results for Low Signal-To-Noise Ratios." The frequency demodulator with feedback is described in an article by L. H. Enloe in the proceedings IRE, Volume No. 50, Jan. 1962, entitled "Decreasing The Threshold in FM by Frequency Feedback."

Both of the above threshold-extending demodulator systems also employ feedback loops, however, they both require voltage-controlled oscillators within their feedback loops for their proper operation. Such voltage-controlled oscillators not only are difficult to construct but also may introduce secondary clicks in the demodulated output.

The present invention provides simpler circuit configurations in its implementation by reason of the fact that no voltage-controlled oscillator is used, and therefore no high frequency circuitry, other than the envelope demodulator is required. In addition, the invention described herein does not introduce secondary clicks.

BRIEF SUMMARY OF THIS INVENTION

When narrow-band noise is added to an FM carrier signal, both the instantaneous envelope and the instantaneous frequency of the resultant signal become noiselike in structure. In particular, as the carrier to noise power ratio drops below about 10 db., the instantaneous frequency possesses a large number of randomly occurring, pulselike noise disturbances referred to herein as clicks. The occurrence of these clicks is primarily responsible for the FM threshold.

The instantaneous envelope is correlated with the instantaneous frequency. Specifically, the instantaneous envelope almost always drops to a low (compared with the average carrier level) when a frequency click occurs. FIG. 4 illustrates the relationship between the instantaneous frequency $\dot{\Psi}(t)$ and the instantaneous amplitude $a(t)$. The invention described herein makes use of this drop in the instantaneous envelope to control the parameters of a feedback loop through which the demodulated instantaneous frequency information of the FM carrier is passed. The feedback loop consists of an error junction driven by the output of an FM demodulator which produces a signal proportional to the instantaneous frequency. The error junction is followed by a multiplier which multiples the output of the error junction by a "processed" form of the instantaneous envelope. The multiplier is in turn followed by a low-pass filter whose output is supplied back to the error junction. The output of the low-pass filter can be used an an output of the feedback loop. The feedback loop output is followed by an equalizing filter which is in turn followed by a second low-pass filter. The output of the second low-pass filter can be used as the system output. The term "process" as used herein describes any linear or nonlinear functional operation as well as such operations combined with memory storage operations performed by filters or delay circuits.

DESCRIPTION OF THE PREFERRED EMBODIMENT

Figure 1:
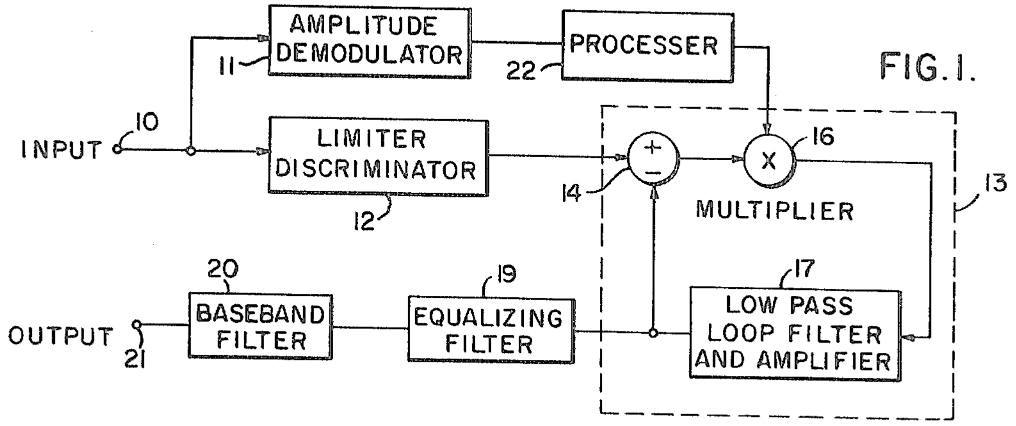
FIG. 1 is a block circuit diagram of the most general embodiment of the present invention.

Basically, the present invention relates to a circuit configuration and apparatus which utilizes the AM information in an incoming noise-corrupted FM carrier to control the parameters of a signal channel through which the demodulated FM information is passed to a utilization device. More specifically, the invention utilizes a processed form of the envelope information to control the loop gain of a feedback loop, which is an element of the signal channel, thereby controlling the bandwidth of the feedback loop through which the demodulated FM information is passed. Thus, if the amplitude of the envelope decreases to a low level relative to its average amplitude and this decrease is employed to greatly reduce the loop gain, the information passed through a very narrow bandwidth channel which effectively "holds" the output level existing prior to the decrease in the envelope.

Since the FM noise threshold is characterized by the occurrence of pulses of clicks in the instantaneous frequency, and since, near the threshold, these clicks are almost always accompanied by low envelope levels on the incoming FM signal, the holding property of the feedback loop eliminates the majority of the clicks from its output and thus extends the noise threshold.

The loop gain of the feedback loop is best controlled by the envelope information by multiplying the signal within the feedback loop by a processed form of the instantaneous envelope. The processed envelope information is, in general, a signal which approaches zero quite closely, either for a fixed or variable length of time, each time the instantaneous envelope decreases toward zero. An example of the processed envelope information on one hand might be a signal directly proportional to the instantaneous envelope, while on the other hand if might be a signal which drops to zero from a preselected level for a predetermined length of time the instantaneous envelope drops below a predetermined level. In addition, the processed envelope information might be any nonlinear function of the instantaneous envelope.

The ability of the feedback loop to hold its output when the processed envelope information decreases toward zero is directly related to the choice of the low-pass filter incorporated at the multiplier output within the feedback loop. In general, any low-pass filter achieves some threshold improvement; however, a filter which approximates a multiple order integrator while still maintaining the stability of the feedback loop achieves a relatively large threshold extension. A second order integrator permits the filter output to estimate not only the previous output signal value but also its slope during a "-hold," thus minimizing the noise induced by "holding."

Depending upon the choice of the loop filter, an equalizing filter may be required at the output of the feedback loop to insure overall undistorted signal transmission when the loop is not being "held." The equalizing filter essentially compensates for any undesired filtering of the instantaneous frequency by the feedback loop such that with no added noise the invention functions as well as conventional FM demodulators.

An embodiment of the invention chosen for the purpose of illustrating the basic concept of the present invention is shown in FIG. 1. Incoming noise-corrupted frequency-modulated carrier signals are supplied to the system through input terminal 10. The system includes an AM demodulator 11 and an FM demodulator 12 connected in parallel to the input terminal 10. The FM demodulators consists of a limiter followed by a discriminator which may be of any desired design, including the conventional Foster-Seeley discriminator, or any other device for performing the same function, such as the FM demodulator described and claimed in applicant's U.S. Pat. No. 3,292,093 issued Dec. 13, 1966.

The FM demodulator 12 drives a feedback loop 13 that includes a subtracting device 14, a multiplier 16 and a low-pass filter and amplifier 17. The loop is closed by connecting the output of the filter and amplifier component 17 to the subtracting device 14 which is previously referred to as an error junction. The output of the component 17 is passed through an equalizing filter 19 to insure an overall undistorted signal transmission when the loop is not being "held." Also a baseband filter 20 is inserted in series with equalizing filter 19 to the output of the system at terminal 21.

The gain of the feedback loop 13 may be controlled directly to signals derived from the envelope information $a(t)$ in the incoming signal supplied by the output of the demodulator 11, which envelope-detects the incoming signals. However, the loop gain is preferably controlled by the envelope information after it has been passed through a processor 22. As previously mentioned in the general description above, the processed information is, in general, a signal which approaches zero quite closely, either for selectively fixed or variable time interval, each time the instantaneous envelope decreases toward zero. Since such a processor; as previously outlined is well known in the art no further description is necessary.

Figure 2:
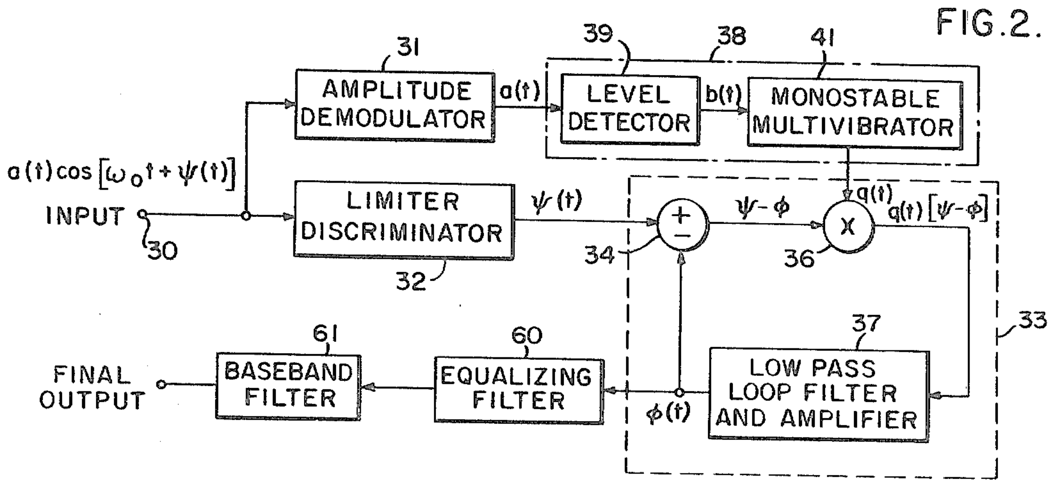
FIG. 2 is a block circuit diagram illustrating a preferred embodiment of the present invention which illustrates envelope processing in the form of two-level quantization followed by a fixed time delay.
Figure 3:
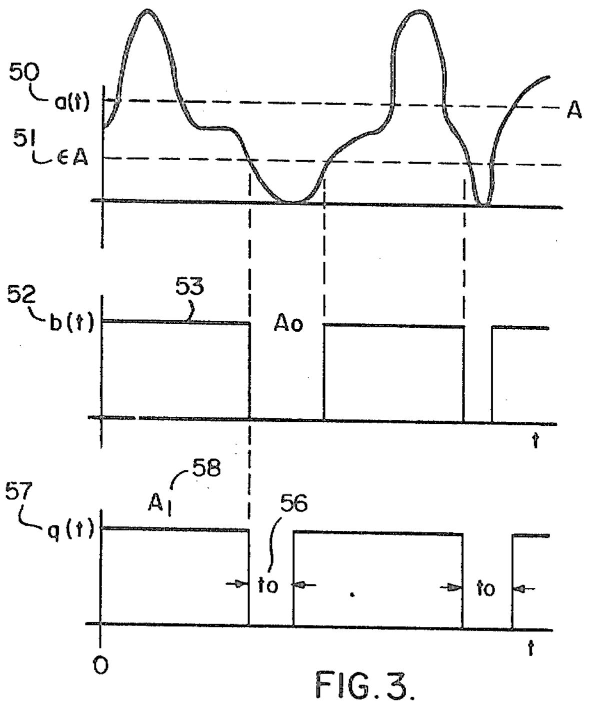
FIG. 3 is a graphical representation of the relationship between the amplitude of the instantaneous envelope of an incoming noise-corrupted FM carrier and the processor output $q(t)$ for the embodiment shown in FIG. 3.
Figure 4:
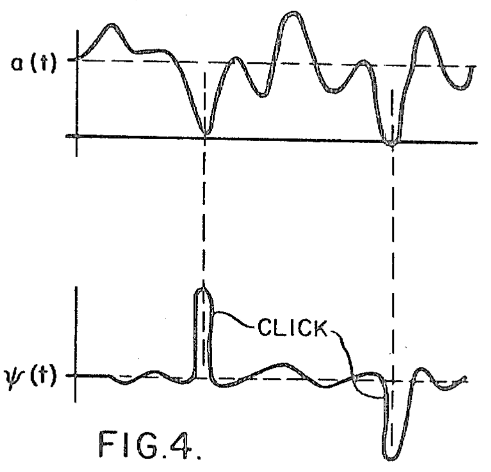
FIG. 4 illustrates the relationship between the instantaneous amplitude $a(t)$ and the instantaneous frequency $\dot{\Psi}(t)$ of a noise-corrupted FM signal during the occurrence of a frequency click.

The preferred embodiment of the present invention is illustrated in FIG. 2. As in FIG. 1 in the first embodiment, a noise-corrupted FM carrier signal is supplied to the system through input terminal 30. The AM modulator 31 and the FM limiter-discriminator 32 may be identical with the corresponding components 11 and 12, respectively, of FIG. 1. Likewise, the summing device 34 and the multiplier 36 may also be identical with the corresponding components 14 and 16, respectively, in FIG. 1.

The essential difference between the two embodiments is that the second embodiment includes a special processor in the form of a quantizer 38 which comprises a level detector 39 and a monostable multivibrator 41. When the input to the level detector $a(t)$ 50 drops below the threshold level $\epsilon A$ 51 the output of the level detector $b(t)$ 52 drops from its present level $A_o$ 53 to zero. The drop of the level detector output to zero triggers the monostable multivibrator 41 causing its output $a(t)$ 57 to drop from a preset level $A_1$58 to zero for a predetermined time $t_o$56. The threshold level $\epsilon A$ and the "-holding" time $t_o$ are adjusted to achieve optimum threshold extension once the parameters of the input FM carrier are known. For the embodiment of FIG. 2, the multiplier 36 may be implemented by a gate or switch which opens the feedback loop when $a(t)$ 57 drops to zero.

As in the previous embodiment the FM limiter-discriminator 32 drives the feedback loop 33. The loop 33 includes the subtraction device 34 (error junction) the multiplier 36 and a low-pass filter and amplifier 37 all of which may be of construction identical or similar, to that of the corresponding components in FIG. 1. The output of the low-pass loop filter and amplifier 37 drives an equalizing filter 60 which in turn drives a baseband filter 61. The system output is derived from the output of the baseband filter 61.

From the foregoing description it should be clear that the feedback loop constitutes a portion of the transmission channel for the FM information signals. Therefore, when one or more of the parameters of the feedback loop are controlled in accordance with the control signal derived from the envelope information the transfer characteristics of the channel will be controlled in the embodiments illustrated.

We claim:

1. Apparatus for demodulating a frequency-modulated carrier comprising,
 means for extracting the instantaneous frequency modulation information from said carrier,
 means for extracting the instantaneous envelope information from said carrier;
 means for processing said instantaneous envelope information for providing a control signal,
 a transmission channel for said frequency modulation information comprising the series combination of a feedback loop, an equalizing filter and a baseband filter;
 and means responsive to said control signal for controlling at least one parameter of said feedback loop thereby controlling the transfer characteristic of said channel.

2. The combination as set forth in claim 1, in which said means for processing instantaneous envelope information provides a control signal which is a linear function of the instantaneous envelope information.

3. The combination as set forth in claim 1, in which said means for processing said instantaneous envelope information provides a control signal which is a nonlinear function of said envelope information.

4. The combination as set forth in claim 1, in which said means for processing said instantaneous envelope information provides a control signal which makes a transition from one preset level to a second preset level and returns to said first preset level after a predetermined time interval said transition from said first preset level to said second preset level corresponding in time to a downward passage of the instantaneous envelope information through a predetermined level.

5. Apparatus for demodulating a frequency-modulated carrier comprising,
 means for extracting the instantaneous frequency modulation information from said carrier,
 mean s for extracting the instantaneous envelope information for said carrier,
 means for processing said instantaneous envelope information for providing a control signal,
 a transmission channel for said frequency modulation information comprising the series combination of a feedback loop, an equalizing filter and a baseband filter,
 said feedback loop comprising a subtraction device, a multiplication device, and a low-pass filter, the output of said subtraction device being supplied to the first input terminal of said multiplication device, the output of said multiplication device being supplied to the input of said low-pass filter, the output of said low-pass filter being supplied to the first input terminal of said subtraction device,
 said frequency modulation information signals being supplied to said feedback loop through the second input terminal on said subtraction device,
 said feedback loop output being obtained from said low-pass filter output terminal,
 said control signal being introduced into said feedback loop at the second input terminal of said multiplication device to thereby control the parameters of said feedback loop.

6. The combination as set forth in claim 5, in which said means for processing said instantaneous envelope information provides a control signal which is a linear function of the instantaneous envelope information.

7. The combination as set forth in claim 5, in which said means for processing said instantaneous envelope information provides a control signal which is a nonlinear function of said envelope information.

8. The combination as set forth in claim 5, in which said means for processing said instantaneous envelope information provides a control signal which makes a transition from one preset level to a second preset level and returns to said first preset level after a predetermined time interval, said transition from said first preset level to said second preset level corresponding in time to a downward passage of the instantaneous envelope information through a predetermined level.